United States Patent [19]

Fitzgerald et al.

[11] Patent Number: 5,049,870
[45] Date of Patent: Sep. 17, 1991

[54] GRAPHIC DISPLAY PANEL

[75] Inventors: Charles A. Fitzgerald, Stone Mountain; Daniel S. Sweeney, Buford, both of Ga.

[73] Assignee: Fitzgerald Engineering Company, Inc., Atlanta, Ga.

[21] Appl. No.: 264,864

[22] Filed: Oct. 31, 1988

[51] Int. Cl.⁵ .......................... G08B 5/36; G08B 5/00
[52] U.S. Cl. ........................ 340/815.2; 340/815.01; 340/815.12; 340/525; 40/573
[58] Field of Search .................. 340/815.01, 815.06, 340/815.12, 815.14, 815.15, 815.16, 815.2, 815.21, 815.23, 815.27, 525, 286.11; 40/449, 564, 549, 624, 573; 362/29, 85, 95; 361/346

[56] References Cited

U.S. PATENT DOCUMENTS

| | | |
|---|---|---|
| 2,930,939 | 3/1960 | Swanson . |
| 3,197,903 | 8/1965 | Walley . |
| 3,573,792 | 4/1971 | Reed .................. 340/815.12 |
| 3,624,648 | 11/1971 | Willoughby . |
| 3,754,245 | 8/1973 | Peprnik . |
| 3,887,913 | 6/1975 | Smith .................. 340/815.12 |
| 4,053,939 | 7/1977 | Dadian .................. 40/573 |
| 4,126,855 | 11/1978 | Alms et al. .............. 340/815.2 |
| 4,301,449 | 11/1981 | Fitzgerald . |
| 4,310,832 | 1/1982 | Fitzgerald . |
| 4,684,940 | 8/1987 | Charmeux .............. 340/815.2 |
| 4,685,029 | 8/1987 | Tillman .................. 361/346 |
| 4,942,275 | 7/1990 | Addy et al. .............. 340/525 |

FOREIGN PATENT DOCUMENTS 2854469  7/1980  Fed. Rep. of Germany ................ 340/815.15

Primary Examiner—Ulysses Weldon
Assistant Examiner—M. Fatahiyar
Attorney, Agent, or Firm—Jones, Askew & Lunsford

[57] ABSTRACT

A graphic display panel for displaying, monitoring, and controlling conditions of a process plant, the graphic display panel including a graphic display sandwiched between translucent support surfaces, and permitting quick and easy rearrangement and repositioning of a lamp assembly associated with the display. The lamp assembly is selectively removably attached to the rear surface of the panel in juxtaposition with a graphic symbol in the graphic display, and illuminates only the localized region including that symbol. Attachment of the lamp assembly directly to the rear surface of the translucent panel permits accurate positioning of the lamp assembly in juxtaposition with a corresponding graphic symbol visible from the rear surface of the display panel.

11 Claims, 2 Drawing Sheets

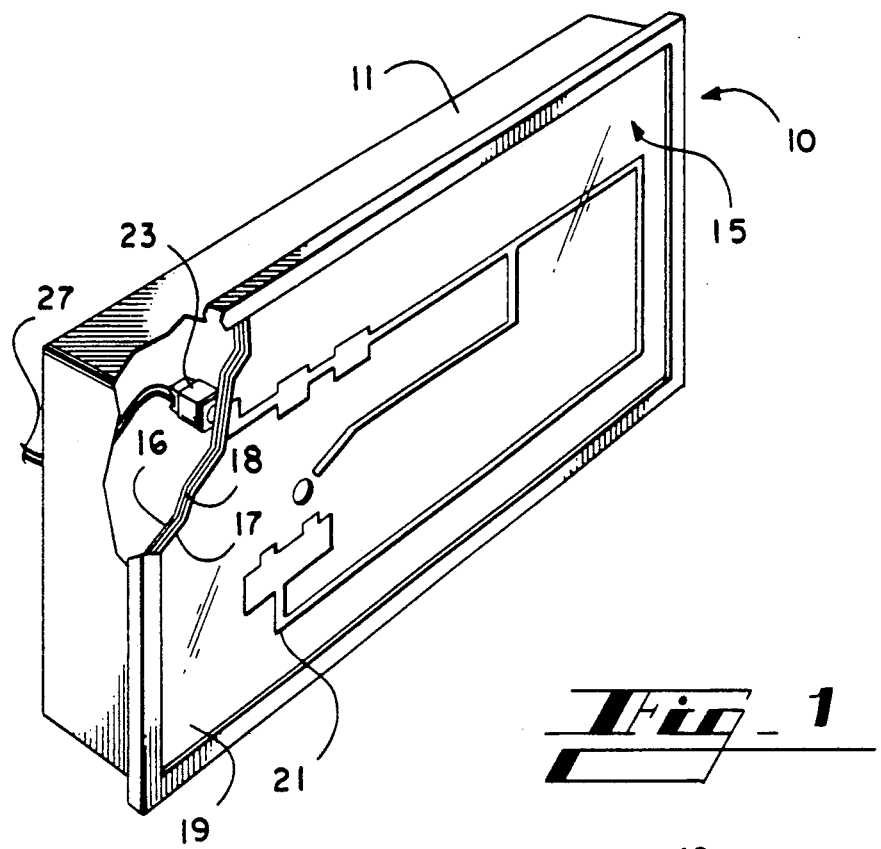
Fig_1
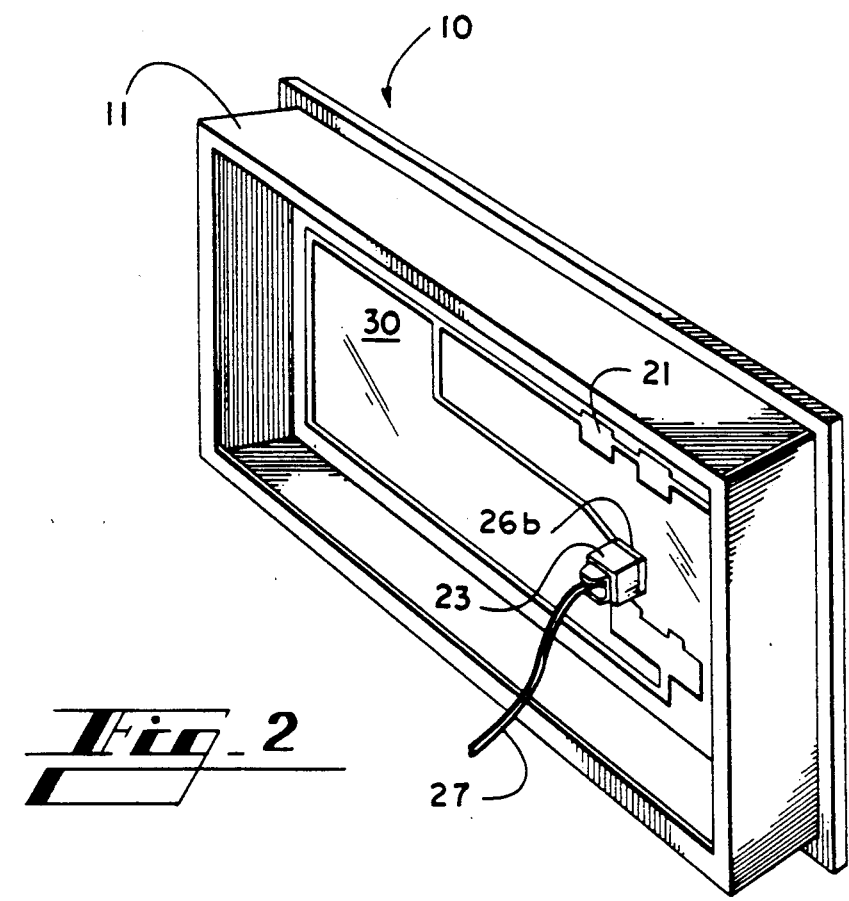
Fig_2

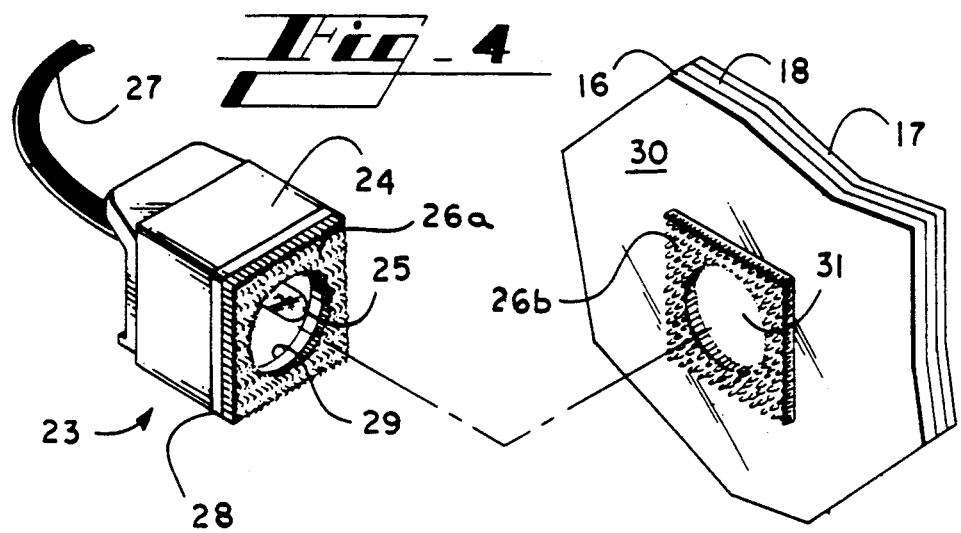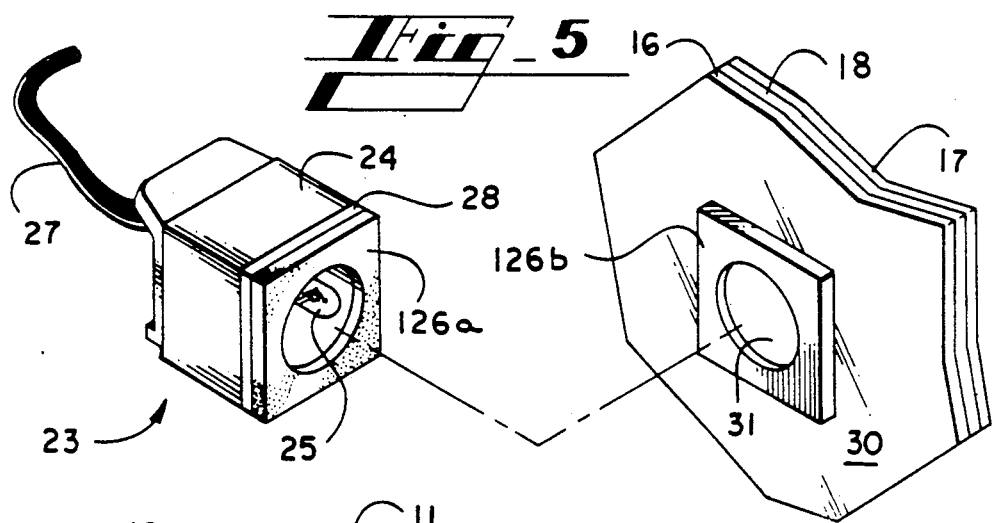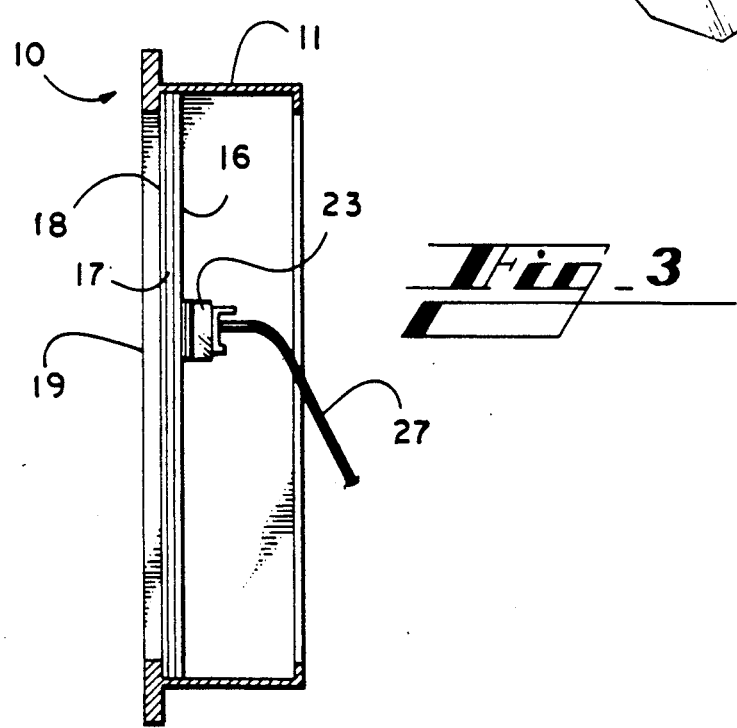

GRAPHIC DISPLAY PANEL

FIELD OF INVENTION

The present invention relates in general to a graphic display panel of the kind used for monitoring or displaying operating conditions of a process plant or the like, and more specifically to a system for positioning and repositioning the localized back lighting of the graphic display panel.

BACKGROUND OF THE INVENTION

Annunciator systems have been developed for monitoring and displaying operating conditions in complex plant systems. The typical annunciator system might include a plurality of gauges for indicating variable parameters such as pressures, temperatures, quantities, or the like for illustrating the various conditions in the process plant. When a complex process is displayed by an annunciator system, the various details and indicators may be so many in number and so complex in their arrangement that a graphic display is desirable in order for the plant operators to understand and easily read the various indicators. A graphic display of this kind usually includes a translucent panel positioned in or near the annunciator cabinet and displaying symbols representing pumps, valves, parameters such as liquid levels or fluid pressures, other plant equipment and conditions, and flow lines extending between the various symbols. The various symbols on the display panel are illuminated by lamps or other light sources placed behind the display panel, and the light emitted by the lamps represent various plant conditions. For example, when a lamp illuminates the symbol of a pump on the display panel, it would indicate a certain condition existing in the pump; e.g., if the pump were in operation, overheated, or not operating properly. Similarly, one or several lamps might illuminate the symbol of a storage tank to indicate an empty, properly filled, or overfilled condition in the storage tank. Associated with such annunciator systems are control systems by which the process plant can be controlled in response to the conditions indicated by the annunciator display and monitoring operations. Examples of typical graphic display annunciator systems and related control devices of the prior art are shown in U.S. Pat. Nos. 3,624,648 to Willoughby and 3,754,245 to Peprnick.

The lamps placed behind the display panel often are mounted onto a backing panel spaced behind the display panel in locations aligned with the graphic symbols representing the process or condition selectively illuminated by each such lamp. Each lamp generally is carried by a socket for mounting on the backing panel. In such annunciator systems, the ability to modify the process plant display or flow chart is limited and costly. Each time the operational process or flow represented by the display panel is modified, e.g., a pump moved or valve sequence rearranged, a new graphic display must be laid out and the lamps usually must be repositioned on the backing panel to coincide with different locations on the graphic display. Whenever a symbol of representation on the display panel is relocated, a corresponding new position for the lamp must be identified on the backing panel so as to juxtapose each lamp with the corresponding graphic symbol on the display panel. The graphic display panel unit must at least be partially opened or taken apart to separate the backing panel from the display panel in order to relocate the lamp on the backing panel. Determining the proper mounting location on the backing panel is, in practice, often a guessing game as the person revising the graphic display panel must work within the partially disassembled unit. That person relocates the lamp on the backing panel to a position which appears at least approximately aligned with the corresponding graphic symbol on the display panel, and then assembles (or reassembles) the display panel and tests the lamp to see whether lamp and graphic symbols are indeed aligned. Typically, the lamp will be somewhat misaligned with the corresponding graphic symbol, and the person must again take the panel apart to adjust the location of the lamp on the backing panel. This process may require several iterations for each lamp in a display panel typically containing numerous lamps requiring alignment, either when the display panel is initially built or subsequently modified. Consequently, there is a need for a graphic display panel which provides localized internal lighting that is easily repositionable.

SUMMARY OF THE INVENTION

Stated in general terms, graphic display panels according to the present invention include at least one lamp attached to the rear surface of the display panel in close juxtaposition with a graphic symbol visible from the front of the display panel. The lamp is positioned in relatively precise alignment with the graphic symbol, which normally is visible at the rear surface of the display panel. The lamp thus illuminates only the localized region including that symbol. As a result, the characteristic graphic symbol is visibly distinguished on the front surface from other visible portions of the panel. The lamp preferably is selectively removably attached to the rear surface of the display panel, so that the lamp is readily relocatable thereon with accurate alignment without the try-and-see approach required by previous graphic display panels.

Stated somewhat more specifically, the lamp includes a mounting element which removably attaches to the rear surface of the display panel, and a lamp element which attaches to the mounting element. The force required to remove the mounting element from the rear surface is greater than the force required to remove the lamp element from the mounting, so that the lamp element is quickly and easily removable from the rear surface once the mounting element is located on that surface. The surface area of the mounting element of the lamp preferably is larger than the localized region containing the graphic symbol and includes an opening therethrough of reduced area aligned with the graphic symbol, through which opening the source of illumination is aligned to direct light therethrough onto the graphic symbol when the source is adhered to the portion of the lamp which attaches to the panel.

More specifically yet, the lamp may be attached to the panel by means of a hook-and-loop connector such as Velcro ® brand fasteners, or by a magnetic connector. The mounting element may be removably mounted on the panel with semi-permanent adhesive and the complementary portion of the connector is attached to the lamp. A semi-permanent adhesive as used herein is one which permits deliberate removal of the mounting element from the panel, but which resists such removal whenever the lamp is removed from the mounting element.

Accordingly, it is an object of the present invention to provide an improved graphic display panel.

It is another object of the present invention to provide a graphic display panel with improved back illumination for indication or control.

It is still another object of the present invention to provide a graphic display panel in which the graphic display and corresponding illuminating devices can be quickly and easily changed.

Yet another object of the present invention is to provide illuminating devices for a graphic display panel, which devices can be removably mounted in an infinite number of positions on the rear surface of a graphic display panel and which are operated in response to conditions at a monitored site.

It is still another object of the present invention to provide a graphic display panel that has inexpensively mounted illuminating devices.

BRIEF DESCRIPTION OF THE DRAWINGS

FIG. 1 shows a partially broken away pictorial view of a graphic display panel according to a preferred embodiment of the present invention.

FIG. 2 is a rear perspective view of the graphic display panel shown in FIG. 1.

FIG. 3 is a section view of the graphic display panel shown in FIGS. 1 and 2.

FIG. 4 is a pictorial view of the illumination assembly and mount according to a first disclosed embodiment.

FIG. 5 is a pictorial view of the illumination assembly and mount according to a second disclosed embodiment.

DETAILED DESCRIPTION OF THE PREFERRED EMBODIMENTS

Referring now in more detail to the drawings in which like numerals represent like components throughout the several views, FIG. 1 shows a graphic display panel indicated generally at 10 mounted in a surrounding housing 11. The graphic display panel 10 includes a display panel 15 which may be of conventional construction. As best shown in FIG. 3, the display panel 15 comprises three planar layers of material sandwiched together to form the display panel shown in assembly in FIG. 3 and shown broken-away in FIG. 1. The multi-layer display panel 15 includes an innermost support layer 16 made of a transparent or translucent material such as glass, plexiglass, or the like. The outer sheet 17 is also a solid sheet of a translucent or preferably transparent material. Sandwiched between the support sheet 16 and the outer sheet 17 is the display sheet 18, which may be a relatively thin and flexible translucent or opaque material such as mylar or the like, to which is applied art work symbols 21 (FIGS. 1 and 2) of one or more contrasting colors or degrees of optical transmissivity, or both. The art work symbols 21 carried by the display sheet 18 are visible through the outer sheet 17 and depict the process or system for which the graphic display panel 10 is provided, typically representing elements such as pumps, storage tanks, valves, switches, and other elements utilized to model the operations of a process or the like. The outer sheet 17 preferably has a nonglare front surface 19, so as to reduce glare by minimizing ambient light reflection from the front surface.

The relative rigidities of the three sheets 16, 17, and 18 may be varied as a matter of design choice or by parameters such as the weight of the illuminating devices.

As best seen in FIG. 2, positioned within the housing 11 of the graphic display panel 10 is an illuminating device such as the lamp assembly 23 having a conventional signal line 27 connected thereto. The illuminating device is shown attached to the back surface 30 of the innermost support layer 16 of the panel 15 in juxtaposition with a graphic symbol 21. FIG. 3 shows the spatial relationship of the illuminating means 23 within the housing 11 of graphic display panel 10 with respect to the three sheets 16, 17, and 18.

Shown in FIG. 4 is a first embodiment of the present invention wherein the lamp assembly 23 includes a housing 24 containing a source of illumination such as an electrical light 25 or the like. The front base 28 of the housing 24 is flat, and supports a mounting member 26a comprising one side of a hook-and-loop fastener material such as Velcro ® material or the like. A mounting member 26b of complementary hook-and-loop fastener material is removably adhered to the back surface 30 of the innermost support layer 16 by an adhesive attachment or the like. The degree of mutual adhesion achieved between the mounting member 26b on the back surface 30 and the complementary mounting member 26a on the light-emitting portion of the lamp assembly 23 must be less than the degree of adhesion between the mounting member 26b and the back surface 30. Those skilled in the art will appreciate the economy afforded by the use of such relatively inexpensive hook-and-loop fasteners.

In a second disclosed embodiment of the present invention shown in FIG. 5, the lamp assembly 23 is selectively removably attached to the back surface 30 of the innermost support layer 16 by magnetic attraction instead of the hook-and-loop material shown in FIG. 4. A magnetic plate 126a is affixed to the mounting plate 28 of the lamp assembly, and the magnetic plate holds the lamp assembly onto the support layer 16 by magnetic attraction of the ferrous mounting assembly member 126b adhered to the back surface 30 by means of a suitable adhesive or the like. As with the first embodiment described above, the force required to separate the magnetic plate 126a from the ferrous mounting member 126b must be lower than the degree of adhesion between the ferrous mounting member 126b and the support sheet 16. Otherwise, selective temporary removal of the lamp assembly 23 from the display panel 15, e.g., to realign the light 25, could not take place without dislocating the mounting member 126b from the support sheet 16. It will be understood by those skilled in the art that the plate 126a could be ferrous, and mounting member 126b magnetic.

The position of the lamp assembly 23, in juxtaposition with a particular graphic symbol 21, is easily reestablished each time the lamp assembly is removed from the display panel 15. By making the adhesion between complementary mounting members 26a and 26b, or the degree of magnetic attraction between magnetic plate 126a and ferrous mounting member 126b less than the degree of attraction between the support sheet 16 and the mounting member 26b or the ferrous base 126b, the present invention permits both temporary removal of the lamp assembly 23 and the complete repositioning of the lamp assembly as achieved by removal of the mounting member 26b or ferrous mounting member 126b from support sheet 16. When repositioning or initially positioning the lamp assembly, the corresponding mounting member 26b or 126b first is positioned on the back surface 30 of the innermost support layer 16 in juxtaposition with the particular corresponding graphic symbol 21.

The surface area of the mounting member 26b or 126b is larger than the localized region containing the graphic symbol 21 to be illuminated and includes an opening 31 of reduced area corresponding to the area of desired illumination for the graphic symbol 21. The opening 31 is aligned with the graphic symbol 21 and the mounting plate 26b or 126b is adhesively attached to the back surface 30. The lamp assembly 23 now can be attached (or reattached) to the mounting plate 28, with the mounting plate 28 aligned with mounting plate 26b/126b to provide accurate alignment of the lamp assembly with the graphic symbol. The opening 29 in the front face 28 of the lamp assembly 23 is aligned with the opening 31 to direct illumination therethrough onto the graphic symbol 21 when the lamp assembly 23 is attached to the mounting plate 26b/126b.

Those skilled in the art will realize that other materials besides hook-and-loop-fasteners or magnetic closures can serve to attach the light-emitting means to the mounting member, without affecting the nature or the operation of the illuminating device according to the present invention.

While this invention has been described in specific detail with particular reference to preferred embodiments thereof, it will be understood that variations and modifications can be effected within the spirit and scope of the invention as described above and as defined in the appended claims.

We claim:

1. A graphic display device for displaying information, comprising:
   a light-transmissive display panel carrying a graphic display corresponding to an operating condition, the display panel having a front side and a back side;
   a light-transmissive support panel disposed behind said display panel immediately adjacent said back side of said display panel, the support panel having a back side uninterrupted over an area substantially coextensive with the display panel;
   at least one light emitting signal means illuminating only a localized area of said support panel;
   a strip of material having a front and a back and having an aperture therein to permit transmission of light;
   said strip having on the back side a semi-permanent adhesive backing removably attached to a localized portion of the back side of said support panel and permitting repositioning of said strip on said support panel;
   said light emitting means including means for removably mounting said light emitting means to said strip of material; and
   said strip having on the front side means for mounting said light emitting means, the mounting means being operative to detachably engage said light emitting means,
   thus permitting quick and easy rearrangement and repositioning of light emitting means on the uninterrupted back side of the panel in juxtaposition with the graphic device.

2. The device of claim 1, wherein the force required to remove said back side of said strip from said support panel is greater than that required to remove said light emitting means from said front side of said strip.

3. The device of claim 2, wherein said strip of material comprises one side of a hook-and-loop fastener.

4. The device of claim 3, wherein said means for mounting said light emitting means to said strip of material comprises the complementary side of the hook-and-loop fastener.

5. A graphic display device for monitoring and displaying information, comprising:
   a light-transmissive display panel carrying a graphic display and having a front side and a back side;
   a light-transmissive support panel disposed behind said display panel immediately adjacent said back side of said display panel and having an uninterrupted back surface;
   at least one light emitting means illuminating only a localized area of the back surface of said display panel;
   a first support member having a front side and a back side;
   said first support member having on the back side a semi-permanent adhesive backing removably attached to said support panel and permitting repositioning of said first support member on the uninterrupted back surface of said support panel; and
   said light emitting means including a second support member selectively removably attachable to the first support member for removably mounting said light emitting means to said first support member, thus permitting quick and easy rearrangement and repositioning of the light emitting means associated with the graphic device, at any selected location on the uninterrupted back surface, by relocating the first support member on the back surface and then reattaching the light emitting means to the relocated first support member.

6. The device of claim 5, wherein one of the first and second support members is magnetic and the other is magnetically attracted thereto.

7. The device of claim 5, wherein the force required to remove said back side of said strip from said support panel is greater than that required to remove said light emitting means from said front side of said first support member.

8. In a graphic display device for displaying information, having a light-transmissive graphics display panel, a light-transmissive support panel having an uninterrupted back surface, and light-emitting means, the improvement comprising:
   means for removably mounting said light-emitting means at any location on the uninterrupted back surface of said support panel, comprising a strip of material having a front and a back and having an aperture therein to permit transmission of light;
   said strip having on the back side a semi-permanent adhesive backing, removably attached to said support panel and permitting repositioning of said strip on said support panel;
   said light emitting means including means for mounting said light emitting means to said strip of material; and
   said strip having on the front side means for mounting said light emitting means operative to detachably engage said light emitting means therefrom, thus permitting quick and easy rearrangement and repositioning of light emitting means associated with the graphic device.

9. The device of claim 8, wherein the force required to remove said back side of said strip from said support panel is greater than that required to remove said light emitting means from said front side of said strip.

10. The device of claim 9, wherein said strip of material comprises one side of a hook-and-loop fastener; and said means for mounting said light emitting means to said strip of material comprises the complementary side of the hook-and-loop fastener.

11. A graphic display panel with relocatable localized back lighting, comprising:
- a light-transmissive support panel having a back surface uninterrupted over a display area, and having a front surface;
- a light-transmissive graphic display panel disposed in close proximity to the front surface of the support panel so as to overlay the display area, the display panel having at a predetermined location thereon at least one graphic symbol occupying substantially less than the display area;
- at least one source of localized illumination removably attached to the uninterrupted back surface of the support panel at a location thereon juxtaposed with the location of the graphic symbol on the overlaid display panel, the illumination source operating to illuminate substantially only that juxtaposed location and being selectively relocatable on the uninterrupted back surface for placement in juxtaposition with a graphic symbol at any other location on the display area;
- the source of illumination comprising a mounting member removably adhered to the rear surface with a first degree of adhesion, so that the mounting member can be removed from and relocated on the rear surface;
- the source of illumination being removably adhered to the mounting member with a second degree of adhesion less than the first degree of adhesion, so that the source is selectively removable from the mounting member without removing the mounting member from the rear surface;
- the mounting member being larger than the predetermined location containing the graphic symbol and including an opening therethrough of reduced area aligned with the graphic symbol; and
- the source of illumination being aligned with the opening to direct illumination therethrough onto the graphic symbol when the source is adhered to the mounting member.

* * * * *